US012777400B2

(12) United States Patent
Chandrashekar

(10) Patent No.: US 12,777,400 B2
(45) Date of Patent: Oct. 27, 2026

(54) LTM FAILURE HANDLING USING A FALLBACK CONFIGURATION FOR ONE OF A RADIO LINK FAILURE (RLF) OR A HANDOVER (HO) FAILURE OF A USER EQUIPMENT (UE)

(71) Applicant: Rakuten Symphony, Inc., Tokyo (JP)

(72) Inventor: Subramanya Chandrashekar, Karnataka (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 128 days.

(21) Appl. No.: 18/555,862

(22) PCT Filed: Aug. 24, 2023

(86) PCT No.: PCT/US2023/031002
§ 371 (c)(1),
(2) Date: Oct. 18, 2023

(87) PCT Pub. No.: WO2025/042396
PCT Pub. Date: Feb. 27, 2025

(65) Prior Publication Data
US 2025/0081075 A1 Mar. 6, 2025

(51) Int. Cl.
*H04W 36/36* (2009.01)
*H04W 36/30* (2009.01)

(52) U.S. Cl.
CPC ....... *H04W 36/362* (2023.05); *H04W 36/305* (2018.08)

(58) Field of Classification Search
CPC . H04W 36/305; H04W 36/30; H04W 36/362; H04W 36/36
See application file for complete search history.

(56) References Cited

FOREIGN PATENT DOCUMENTS

WO 2023137693 A1 7/2023

OTHER PUBLICATIONS

Fujitsu, "LTM procedure for different scenarios", 3GPP TSG-RAN WG2 Meeting #121-bis electronic, Apr. 7, 2023, R2-2303008, 5pp.
Nokia et al., "On the cell switch in LTM", 3GPP TSG-RAN WG2 Meeting #122, May 12, 2023, R2-2305909, Incheon, South Korea, 5pp.
Samsung, "RRC issues on the LTM", 3GPP TSG-RAN WG2 Meeting #121, Feb. 17, 2023, Athens, Greece, 8pp.
Xuelong Wang et al., "Failure Handling for L1/L2 Triggered Mobility", 3GPP TSG-RAN WG2 Meeting #123, Agenda Item 7.4.2.1, R2-2307138, Toulouse, France, Aug. 21-25, 2023, 5pp.

*Primary Examiner* — Tuan H Nguyen
(74) *Attorney, Agent, or Firm* — HAUPTMAN HAM, LLP

(57) ABSTRACT

A fallback configuration is prepared for one of a Radio Link Failure (RLF) or a handover (HO) failure of a User Equipment (UE). Layer 1 (L1)/Layer 2 (L2) Triggered Mobility (LTM) candidate cells are identified for fallback. An HO failure or an RLF is predicted for LTM target cells and at least one of a fallback LTM configuration or a fallback Conditional Handover (CHO) configuration is prepared for a target cell selected from the one or more LTM candidate cells. The UE is provided with the at least one of the prepared fallback LTM configuration or the fallback CHO configuration for the target cell. Control information is sent to the UE to initiate a cell switch by the UE from a serving cell to the target cell based on the at least one of the prepared fallback LTM configuration or the fallback CHO configuration for the target cell.

20 Claims, 6 Drawing Sheets

LTM FAILURE HANDLING USING A FALLBACK CONFIGURATION FOR ONE OF A RADIO LINK FAILURE (RLF) OR A HANDOVER (HO) FAILURE OF A USER EQUIPMENT (UE)

RELATED APPLICATIONS

The present application is a National Phase of International Application No. PCT/US2023/031002, filed Aug. 24, 2023.

TECHNICAL FIELD

This description relates to LTM failure handling using a fallback configuration for one of a Radio Link Failure (RLF) or a Handover (HO) failure of a User Equipment (UE), and method of using the same.

BACKGROUND

L1/L2 Triggered Mobility (LTM) is fundamentally different from the traditional or legacy Layer 3 Mobility in in terms of its execution. Layer 3 Mobility or the baseline mobility or legacy mobility concept, revolves around network configuring the User Equipment (UE) with Radio Resource Control (RRC) measurements or layer 3 measurements, and then the network using those measurements to prepare the target cells and subsequently sending handover command to the UE. The target cell configuration and the handover command are provided to instruct a UE to handover to the target cell. For LTM, a UE may be configured for lower layer mobility, such as Layer 1 (L1)/Layer 2 (L2) triggered mobility, where the UE may perform lower layer handover procedures so that the UE may dynamically perform a handover procedure to a different cell in the same or neighboring base station.

The difference between L3 mobility and L1/L2 triggered mobility is that with L3 mobility the UE is configured to provide RRC measurements. As usual, the UE provides those using the RRC protocol in an L3 message that goes to the Centralized Unit (CU) of the gNB, the CU decides the candidate/target cells which are to be prepared for the mobility, which could be legacy L3 HO or advanced L3 Hos like Conditional HO(CHO) or Dual Active Protocol Stack (DAPS HO), i.e., one or more target/candidate cells, and the CU contacts the corresponding DU to prepare the target cell configuration. The target cell configuration and the L3 HO command is retrieved by the CU and then sent to the UE. In case of CHO, there is no HO command from the gNB, but a HO criteria sent to the UE and the UE autonomously executes HO whenever the HO criteria is satisfied. The fundamental difference with L1/L2 HO is while the preparation of the handover is performed as per the existing principles of baseline handover, the execution of handover is performed using L1/L2 protocols. In other words, L1/L2 inter-cell centric mobility involves a UE receiving L1/L2 signaling during cell switch instead of RRC signaling as is the case with L3.

In response to there being an LTM Handover (HO) failure e.g., due to sudden Radio Link Failure (RLF), configuration failure, non-delivery of Media Access Control (MAC) Control Element (CE) HO command, etc., RRC Re-establishment is performed as is the case with any other mobility procedure. However, RRC Re-establishment is an expensive procedure for the network and the UE. The UE loses the user plane sessions and data transfer is interrupted. Hence, RRC re-establishment is to be avoided whenever possible.

As a fallback to prevent UE from performing RRC re-establishment in case of LTM HO failure, UE is able to consider one of the LTM candidate cells and autonomously perform a RACH (without an explicit HO command from the network) to gain access to a candidate cell. Of course, such a scenario is based on the candidate/target cell being visible to the UE and satisfying a certain pre-defined radio condition. However, multiple LTM candidate cells are able to be configured for a UE without resources to be used being fully reserved at the candidate cell, i.e., the resource reservation is delayed for until the candidate cell is reported by the UE with a good radio condition in the L1 Measurement report to the serving or target gNB-DU. Even for candidate cells with other resources reserved, a Random-Access Channel (RACH) preamble may not be reserved right at the time of target cell configuration preparation as the RACH resources could be dependent on the beam/beam-group of the UE that is subject to change until the UE arrives in the target cell.

Reservation of the RACH preamble ensures that the correct RACH preamble corresponding to the UE's best beam at the candidate cell is able to be reserved later in response to the UE moving close to the candidate cell border. Under such conditions, the UE cannot choose LTM candidate cells autonomously or arbitrarily.

SUMMARY

In at least embodiment, a method for preparing a fallback configuration for one of a Radio Link Failure (RLF) or a handover (HO) failure of a User Equipment (UE) includes identifying one or more Layer 1 (L1)/Layer 2 (L2) Triggered Mobility (LTM) candidate cells for fallback, predicting at least one of an HO failure or an RLF for one or more LTM target cells, in response to predicting the at least one of the RLF or HO failure for the one or more LTM target cells, preparing at least one of a fallback LTM configuration or a fallback Conditional Handover (CHO) configuration for at least one of the one or more LTM target cells selected from one or more LTM candidate cells, providing the UE with the at least one of the prepared fallback LTM configuration or the fallback CHO configuration for the at least one of the one or more target cells, and sending control information to the UE to initiate a cell switch by the UE from a serving cell to the at least one of the one or more LTM target cells based on the at least one of the prepared fallback LTM configuration or the fallback CHO configuration for the at least one of the one or more LTM target cells.

In at least one embodiment, a Radio Access Network (RAN) Node includes a memory storing computer-readable instructions, and a processor connected to the memory, wherein the processor is configured to execute the computer-readable instructions to identify one or more Layer 1 (L1)/Layer 2 (L2) Triggered Mobility (LTM) candidate cells for fallback, predict at least one of an HO failure or a Radio Link Failure (RLF) for one or more LTM target cells, in response predicting the at least one of the HO failure or the RLF for the one or more LTM target cells, prepare at least one of a fallback LTM configuration or a fallback Conditional Handover (CHO) configuration for at least one of the one or more LTM target cells selected from one or more LTM candidate cells, provide a User Equipment (UE) the at least one of the prepared fallback LTM configuration or the fallback CHO configuration for the at least one of the one or more LTM target cells, and send control information to the UE to initiate a cell switch by the UE from a serving cell to the at least one of the one or more LTM target cells based on the at least one of the prepared fallback LTM configuration or the fallback CHO configuration for the at least one of the one or more LTM target cells.

In at least one embodiment, a non-transitory computer-readable media having computer-readable instructions stored thereon, which in response to being executed by a processor causes the processor to perform operations including identifying one or more Layer 1 (L1)/Layer 2 (L2) Triggered Mobility (LTM) candidate cells for a fallback for User Equipment (UE), predicting at least one of a handover (HO) failure or a Radio Link Failure (RLF) for one or more LTM target cells, in response to predicting the at least one of the RLF or the HO failure for the UE, preparing at least one of a fallback LTM configuration or a fallback Conditional Handover (CHO) configuration for at least one of the one or more LTM target cells selected from one or more LTM candidate cells, providing the UE with the at least one of the prepared fallback LTM configuration or the fallback CHO configuration for the at least one of the one or more LTM target cells, and sending control information to the UE to initiate a cell switch by the UE from a serving cell to the at least one of the one or more LTM target cells based on the at least one prepared fallback LTM configuration or the fallback CHO configuration for the at least one of the one or more LTM target cells.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
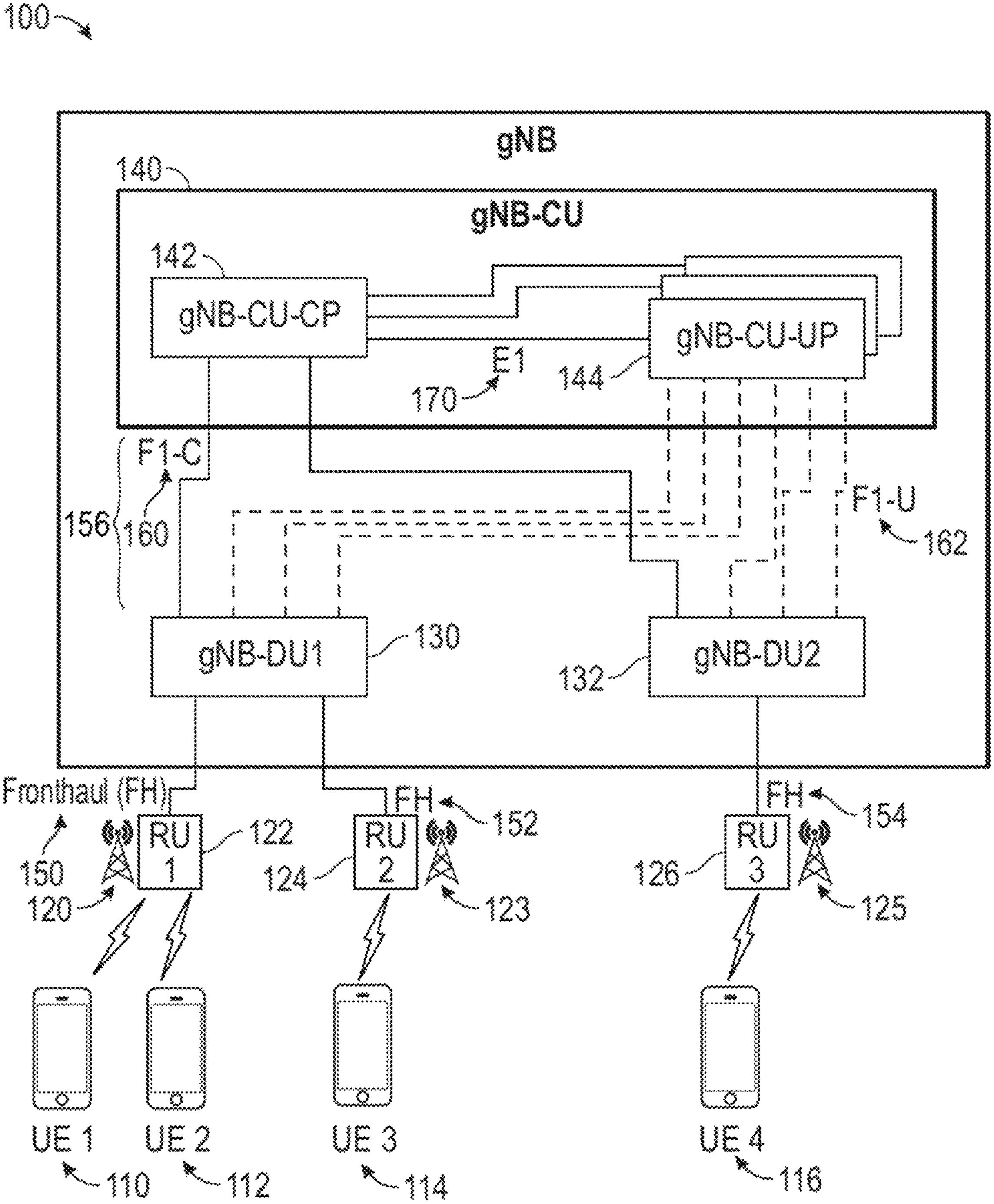
FIG. 1 illustrates a disaggregated Radio Access Network (RAN) architecture according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

In at least one embodiment, a method for preparing a fallback configuration for one of a Radio Link Failure (RLF) or a handover (HO) failure of a User Equipment (UE) includes identifying one or more Layer 1 (L1)/Layer 2 (L2) Triggered Mobility (LTM) candidate cells for fallback, predicting at least one of a handover (HO) failure or a Radio Link Failure (RLF) for one or more LTM target cells, in response to predicting the at least one of the RLF or HO failure for the one or more LTM target cells, preparing at least one of a fallback LTM configuration or a fallback Conditional Handover (CHO) configuration for at least one of the one or more LTM target cells selected from one or more LTM candidate cells, providing the UE with the at least one of the prepared fallback LTM configuration or the fallback CHO configuration for the at least one of the one or more target cells, and sending control information to the UE to initiate a cell switch by the UE from a serving cell to the at least one of the one or more LTM target cells based on the at least one of the prepared fallback LTM configuration or the fallback CHO configuration for the at least one of the one or more LTM target cells.

Embodiments described herein provide method that provides one or more advantages. For example, RRC re-establishment can be avoided during Radio Link Failure (RLF) or LTM Handover (HO) failure.

FIG. 1 illustrates a disaggregated Radio Access Network (RAN) architecture 100 according to at least one embodiment.

In FIG. 1, UE 1 (User Equipment 1) 110, UE 2 112, UE 3 114, UE 4 116 access a mobile network via RAN 100. Radio Access Network 100 includes Radio Towers 120, 123, 125. Radio Towers 120, 123, 125 are associated with RU (Radio Unit) 1 122, RU 2 124, RU 3 126, respectively.

RU 1 122, RU 2 124, and RU 3 126 handles the Digital Front End (DFE) and the parts of the PHY layer, as well as the digital beamforming functionality. RU 1 122 and RU 2 124 are associated with gNB-Distributed Unit (gNB-DU) 1 130, and RU 3 126 is associated with gNB-DU2 132. The gNB-DU1 130 and gNB-DU2 132 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data is moves across the physical network.

gNB-DU1 130 is coupled to the RU 1 122 and RU 2 124, and gNB-DU2 132 is coupled to RU 3 126. The gNB-DU1 130 and gNB-DU2 132 run the Radio Link Control (RLC), MAC, and parts of the Physical (PHY) layer. The gNB-DU1 130 and gNB-DU2 132 include a subset of the eNB/gNB functions, depending on the functional split option, and operation of gNB-DU1 130 and gNB-DU2 132 are controlled by Centralized Unit (CU) 140. The gNB-CU 140 is responsible for non-real time, higher L2 and L3 network layer functions. Server and relevant software for gNB-CU 140 is able to be hosted at a site or is able to be hosted in an edge cloud (datacenter or central office) depending on transport availability and the interface for the Fronthaul connections 150, 152, 154. The server and relevant software of gNB-CU 140 is also able to be co-located at gNB-DU1 130 or gNB-DU2 132, or is able to be hosted in a regional cloud data center.

The gNB-CU 140 handles the RRC and PDCP layers. The gNB-CU 140 includes a gNB-CU-Control Plane (CU-CP) 142 and one or more gNB-CU-User Plane (CU-UP) 144, respectively. The gNB-CU-CP 142 is a logical node hosting the RRC and the control plane part of the PDCP protocol of the gNB-CU 140 for gNB 100. The gNB-CU-UP 144 is a logical node hosting the user plane part of the PDCP protocol of the gNB-CU 140, and the SDAP protocol of the gNB-CU 142. The gNB-DU1 130, and gNB-DU1 132 are connected to gNB-CU-CP 142 via Fs-C 160, and gNB-DU1 130, and gNB-DU1 132 are connected to one or more gNB-CU-UP via Fs-U 162 interfaces. The split architecture enables a 5G network to utilize different distribution of protocol stacks between gNB-CU 140, and gNB-DU1 130 and gNB-DU2 132, depending on network design and availability of the Midhaul connection 156. The gNB-CU-CP 142 is coupled to one or more gNB-CU-UP 144 via one or more E1 interfaces 170.

In FIG. 1, two connections are shown between gNB-CU 140 and gNB-DU1 130 and gNB-DU2 132. The gNB-CU 140 is able to implement additional connections to other gNB-DUs (not shown). The gNB-CU 140, in 5G, is able to implement, for example, 256 endpoints or gNB-DUs. The gNB-CU 140 supports the gNB functions such as transfer of user data, mobility control, RAN sharing (MORAN), positioning, session management, etc. However, one or more functions are able to be allocated to gNB-DU1 130 and gNB-DU2 132. The gNB-CU 140 controls the operation of gNB-DU1 130 and gNB-DU2 132 over the Midhaul interface 156.

Figure 2:
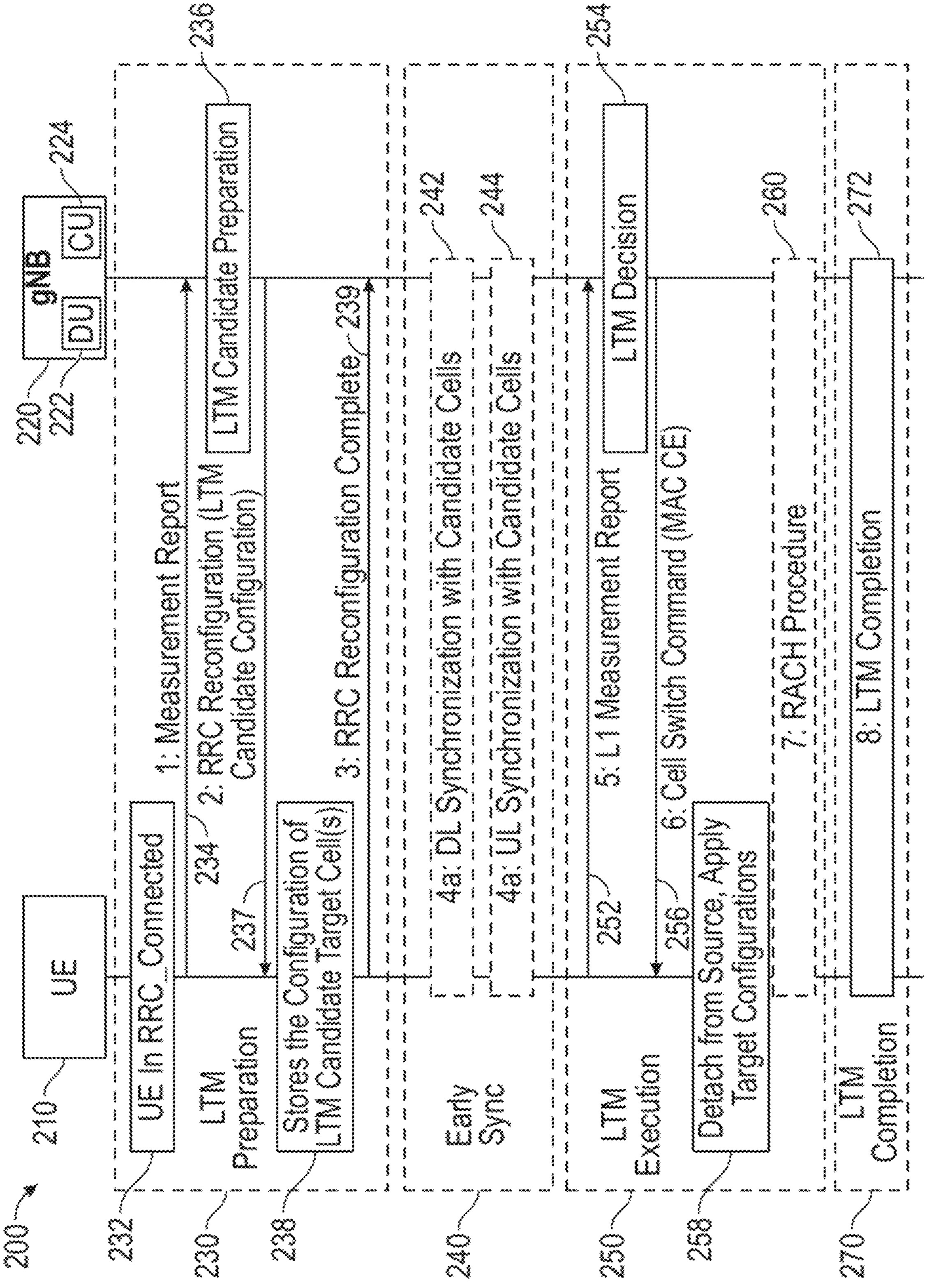
FIG. 2 illustrate the overall procedure for LTM according to at least one embodiment.

FIG. 2 illustrate the overall procedure for LTM 200 according to at least one embodiment.

In FIG. 2, a UE 210 and gNB 220 are shown. The gNB 220 includes one or more DUs 222 and a CU 224. Mobility enhancement 3rd Generation Partnership Project (3GPP) Release 18, RP-213565 specifies mechanisms and procedures of L1/L2 based inter-cell mobility for mobility latency reduction. L1/L2 based inter-cell mobility is applicable to standalone, Carrier Aggregation (CA) and New Radio-Dual Connectivity (NR-DC) case with serving cell change within one Cell Group (CG), intra-DU case and intra-CU inter-DU case (applicable for Standalone and CA: no new Radio Access Network (RAN) interfaces are expected), intra-frequency and inter-frequency, and Frequency Range One (FR1) and FR2 Source and Target cells may be synchronized or non-synchronized.

Execution of LTM Handover (HO) happens at a DU 222. Information regarding which target cells are configured for LTM, or which candidate cells are configured for LTM is provided to a UE 210 as well as the serving gNB 220. A candidate cell is a cell that is prepared for future execution of mobility. A target cell is an LTM candidate cell that is selected for LTM serving cell change or handover. According to embodiments described herein, candidate cell and target cell are used as common terminology. Also, handover, cell switch and serving cell change are used interchangeably in embodiment described herein. Thus, LTM Handover or LTM Serving cell change have the same meaning as used herein. The serving gNB is a cell that the UE 210 is using for service and has a radio link to the serving cell. The corresponding DU associated with that cell is called the serving DU 222. Information of which other cells and that are configured as LTM Candidate cells are provided to the serving DU 222 as well as to the UE 210.

UE 210 is configured to report L1 measurements for the candidate cells. The UE 210 keeps reporting these L1 measurements on a periodic basis to the serving DU 222 and based on these L1 measurements, the serving DU 222 decides regarding the LTM serving cell based on a time and a threshold at which the UE 210 is to be handed over to one of the other candidate cells, which then becomes the target cell. The candidate cell is able to be in the same DU 222, or in another DU (not shown) of the same gNB 220. However, a candidate cell is not able to be outside the gNB 220, because the LTM functionality is limited to one gNB in 3GPP Release 18. For inter-gNB mobility, L3 mobility procedures are used.

There could be a maximum of, for example, 8 candidate cells, although the number of candidate cells being limited to 8 is not codified yet. However, in earlier 3GPP Releases, an agreement was to limit the number to 8 candidate cells for a UE. For example, a feature called conditional handover is able to be used to provide target cell configurations to the UE. Based on this agreement, 8 candidate cells is a fair assumption. However, the number is able to be extended. Thus, the UE 210 is able to be configured with 8 candidate cells out of which one candidate cell is able to be chosen as a target cell. The target cell is chosen by the serving gNB-DU 222 based on the periodic measurements or event based measurements that are received from the UE 210.

In FIG. 2, the first phase is the LTM preparation 230. The UE 210 is in RRC_Connected state 232. UE 210 sends a L3 Measurement Report message 234 to the gNB 220. In FIG. 2, the CU 224 and DU 222 are shown as part of the same gNB 220.

After receiving the L3 measurement report 234, the gNB 220 decides to use LTM for the UE and initiates LTM candidate cell preparation 236, e.g., the gNB 220 prepares one or multiple candidate cells. This includes the CU 224 sending the DU 222 an F1 message, and the DU 222 responding with the candidate cell configuration.

The gNB 220 transmits an RRC reconfiguration message 237 to the UE 210 including the configuration of one or multiple LTM candidate target cells.

The UE 210 stores the configuration of LTM candidate target cell(s) 238 and transmits a RRC Reconfiguration Complete message 239 to the gNB 220 to acknowledge the RRC reconfiguration procedure has been completed.

Early Synchronization 240 is able to be performed using DL synchronization and TA acquisition with candidate cells 240 and UL synchronization and TA acquisition with candidate cells 244 while the UE 210 is still connected to the old serving cell. DL synchronization for candidate cell(s) 242 before cell switch command is supported at least based on SSB. TA acquisition of candidate cell(s) before LTM cell switch command is supported, at least based on PDCCH ordered RACH, where the PDCCH order is triggered by source cell.

After that, LTM Execution 250 is executed, when cell switch criteria is satisfied. The UE 210 performs L1 measurements on the configured LTM candidate target cell(s), and transmits L1 measurement reports 252 to the gNB 220. The L1 measurement report 252 is provided to the DU 222, and not to the CU 224. Then, the gNB 220 makes an LTM cell switch Decision 254 to select one of the candidate configurations at a target configuration for LTM, initiates LTM cell switch to the target cell by transmitting a MAC CE message with an LTM cell switch command 256 that includes the candidate configuration index of the target cell.

After receiving the MAC CE 256, the UE 210 detaches from the serving cell and applies the target cell configuration 258 to switch to the configuration of the LTM candidate/target cell. The candidate cell configurations is able to be added, modified, or released by the network via RRC signaling.

An optional RACH procedure 260 is performed (as indicated by dotted line). For example, a RACH procedure is used in response to the TA not being available. In response to the target cell TA being available, a RACH-less HO procedure is not performed. All LTM HO procedures do not use the RACH procedure 260.

Once the LTM Execution has completed and the UE successfully completes the LTM cell switch towards the target cell, LTM Completion stage 270 is initiated. An RRC Configuration Complete message 272 is sent from UE 210 to the gNB 220. The RRC Configuration Complete message 272 indicates that the RRC Configuration that was sent earlier has been successfully applied. Subsequent LTM is performed by repeating the early synchronization, LTM execution, and LTM completion steps without releasing other candidates after LTM completion.

However, there could be LTM handover failure or serving cell LTM switch failure. A failure, for example, is able to occur due to an RLF or LTM HO failure due to non-reception of the RRC Message 237 that carries the LTM Candidate Configuration to the UE 210, the MAC CE 256 is not received by the UE 210, the radio link is lost, a configuration failure occurs, etc. For example, the LTM Candidate Configuration 237 that was sent to the UE 210 for the target cell is not decoded properly or is not comprehended, etc. Decoding failures also occur due to non-delivery of the MAC CE handover command 256. In view of RLF of LTM HO failure, there will be RRC re-establishment, as is the case with any other mobility procedure.

RRC Re-establishment is an expensive procedure for the network and UE because the user plane sessions are lost and data transfer is interpreted for a longer time. However, an objective is to avoid RRC re-establishment whenever feasible.

A fallback mechanisms is for the UE 210 to consider one of the LTM candidate cells and autonomously perform a RACH procedure 260 to gain access (without an explicit HO command received from the network) provided the candidate cell is visible to the UE 210 and satisfies a certain pre-defined radio condition. In such a scenario, one of the LTM candidate cells is autonomously selected by the UE 210, and a RACH procedure 260 is performed to gain network access. Such an solution has been considered in the past for Conditional Handover (CHO). CHO is a UE based handover where the target cell configuration will be provided to the UE 210, and a condition is also provided. In response to the condition that is provided by the network being satisfied at the UE 210, the UE 210 autonomously performs a handover, and this does not rely on a handover command, or even MAC CE from the network side. Thus, the UE performs handover without the network telling the UE 210 to perform the handover.

Thus, based on these principles, a fallback is able to be considered where one of the LTM Candidates is selected to perform a RACH 260 without an explicit handover command. For the network to gain access there could be multiple LTM candidate cells configured for a UE 210 without requiring resources to be used being reserved. But there are multiple cells and resource reservation at the cells, and considering that thousands of UE existing in a cell, the large number of resource reservations is too expensive to operators.

For that matter, candidate cell resource reservation is not possible for all cells for one UE 210 and for a cell size with thousands of UEs. Such a process is incredibly exhaustive, and has a lot of repercussions for the network as well as for the UE 210 because the UE 210 has to store the configurations, continue receiving timing alignment timing advances (TA), and also report measurements for the configured cells, etc. Accordingly, CHO is very complex and the alternative is to ensure that the target configuration is sent to the UE 210.

As a result, the resources are not all reserved during the LTM target cell preparation. The resources are reserved in response to a UE 210 coming closer to one of the candidate cells. The probability of the UE 210 undergoing HO failure while going to a particular cell or one or more candidate cells is to be determined. For example, if there are 8 candidate cells, wherein the UE going from a serving cell to one of the candidate/target cells based on a cell switch command, the fallback configuration has to be prepared for that candidate cell where the chances of UE undergoing LTM cell switch failure is high. The 2 cells are able to be predicted based on measurements or radio conditions, or AI-ML based predictive algorithms. A prediction identifies which of the 8 LTM candidate cells are susceptible to handover failure, based on the UE 210 approaching a candidate cell or even by sending measurements of neighboring cells and the serving DU 222 communicating that to the target cell. Such a handover failure can also be predicted based on previous data. Based on this handover failure prediction, the candidates and resource reservation can be performed, but only in response to the UE 210 reporting a good radio condition for a given candidate cell. A resource reservation is delayed until a good radio condition is reported by the UE. Until the candidate cell with a good radio condition is reported by the UE 210 in the L1 measurement report to the serving DU 222, the resources for candidate cells are not reserved. But this could be different for candidate cells that are susceptible for LTM cell switch failure since the candidate cells need a fallback configuration.

Even for candidate cells with other Radio resource management (RRM) resources reserved, such as for a very important UE, a RACH preamble is able to not be reserved to ensure that the correct RACH preamble corresponding to the best beam of the UE 210 at the candidate cell is able to be reserved later in response to the UE 210 being close to the candidate cell border. Reserving a RACH preamble in advance means also determining the beam or beam group for a UE 210 in a given sense, which is highly speculative or at least less than optimal given the beam group that the UE 210 is to be associated with is not known in advance. Determining the actual beam group and then performing the correct RACH preamble assignment is more optimal than performing the correct RACH preamble assignment in advance.

In these situations, the UE 210 is not able to choose LTM candidate cells for fallback, out of the 8 candidate cells to perform a RACH operation 260 autonomously or arbitrarily because the UE 210 does not know which resources have been reserved, whether the RACH preamble has been reserved, etc.

Figure 3A:
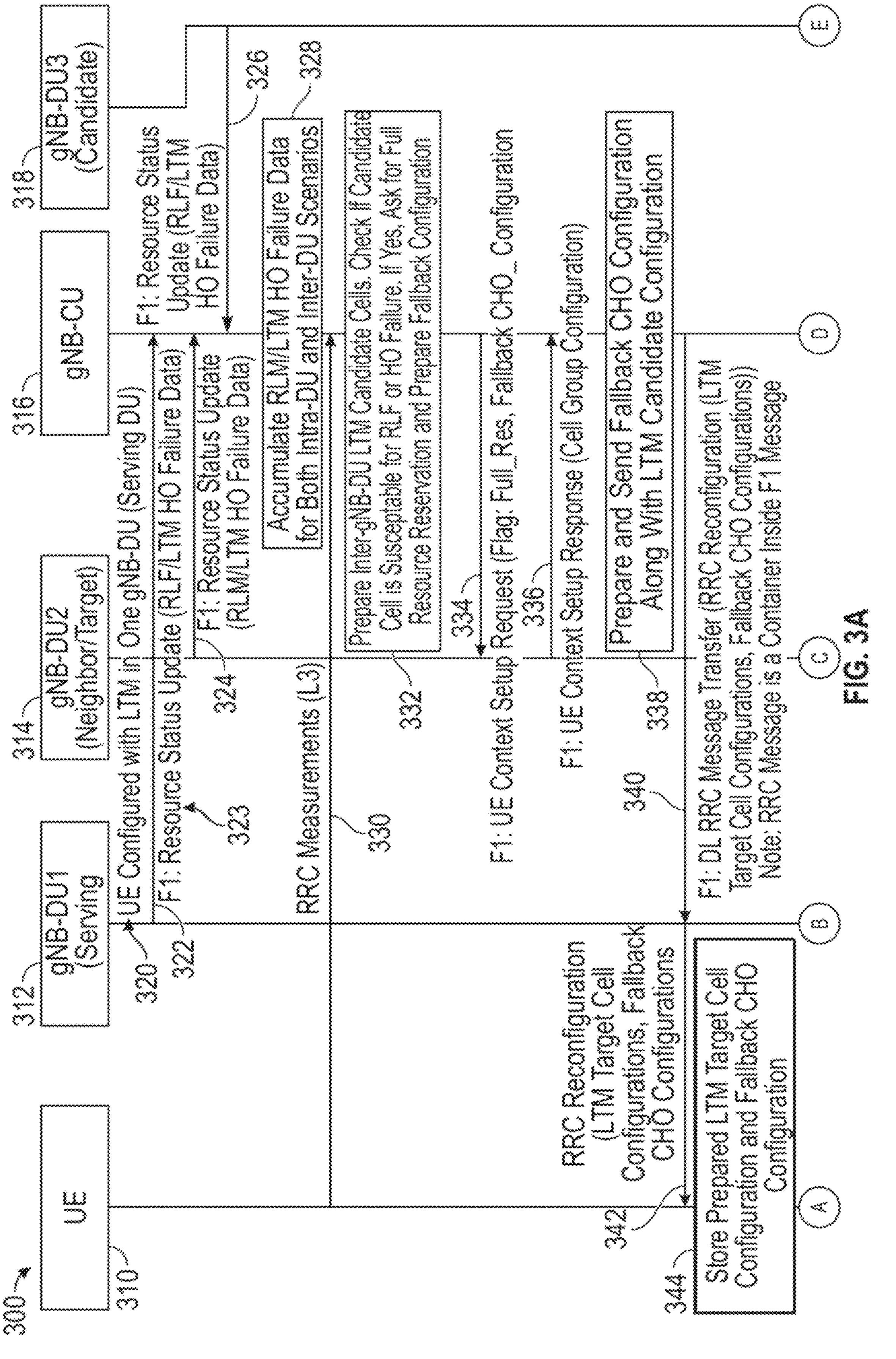
FIGS. 3A-B illustrates a process for LTM failure handling according to at least one embodiment.
Figure 3B:
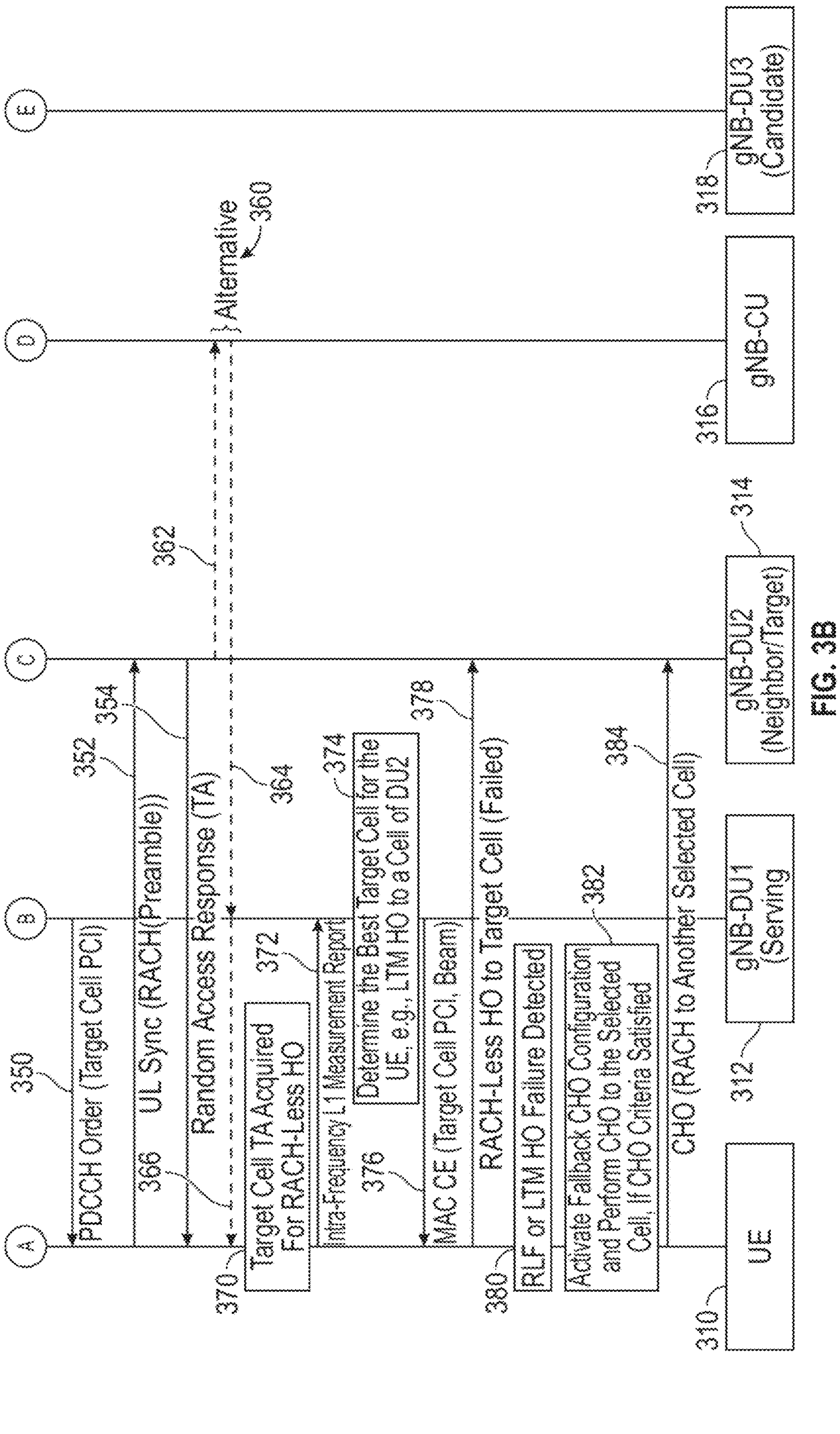

FIGS. 3A-B illustrates a process for LTM failure handling 300 according to at least one embodiment.

In FIGS. 3A-B, the process for LTM failure handling 300 includes preparing a fallback handover configuration for autonomous execution by a UE 310 and a process for performing cell selection. UE 310 is configured 320 with LTM candidate cells in one or more Distributed Units (DUs) 312. A periodic Resource Status Update (RSU) message 322 is provided from the Serving/Candidate DU 312/314/318 to the Centralized Unit (CU) 316 via the F1 interface. However, according to at least one embodiment, RLF and LTM HO failure data 323 is added to the periodic Resource Status Update message 322 so that RLF and LTM HO failure data 323 is collected on a periodic basis for intra gNB-DU scenarios. CU 316 also accumulates RLF and LTM HO failure data 323 for inter gNB-DU scenarios also, provided 324 to CU 316 from Neighbor/Target Cell, DU2 314, and provided 326 to CU 316 from Candidate Cell, DU3 318. Thus, CU 316 is able to identify one or more LTM candidate cells 314, 318 for fallback by identifying the LTM candidate cells that are susceptible for cell switch/handover failure. The identifying the one or more LTM candidate cells 314, 318 for fallback includes identifying which of configured LTM candidate cells 314, 318 of the UE 310 are eligible to be configured for fallback. The one or more LTM candidate cells 314, 318 is able to be identified by receiving a periodic Resource Status Update 322 from one or more gNB-Distributed Units (DUs) 312, 314, 318 wherein the periodic Resource Status Update 322 includes HO failure data 323 for the one or more LTM candidate cells 314, 318. The HO failure data 323 for the one or more LTM candidate cells 314, 318 includes data indicating RLF or LTM HO failure 323 associated with the one or more LTM candidate cells 314, 318. The HO failure data 323 for the one or more LTM candidate cells 314, 318 of one or more gNB-DUs is accumulated over a period of time 328.

Then RRC Measurements 330 are received from the UE 310 at the CU 316, where inter-DU LTM Candidate Cells are decided to be prepared 332. The CU 316 checks whether a candidate cell is susceptible to RLF or LTM HO Failure 332. In response to the candidate cell being susceptible to RLF or LTM HO Failure 332, the CU 316 predicts at least one of an HO failure or an RLF for one or more LTM target cells in candidate DU 314, 318. The CU 316 decides full resource reservation and prepares fallback configuration for the identified candidate cells.

The CU 316 sends UE 310 Context Setup Request 334 via the F1 interface to the neighbor/target cell, e.g., DU2 314, a flag with full resource reservation and a fallback CHO Configuration required indication. The neighbor/target cell, e.g., DU2 314, responds with a UE Context Setup Response 336 via the F1 interface. The UE Context Setup Response 336 provides a Cell Group Configuration to the CU 316. The CU 316 then prepares and sends 338 a fallback CHO configuration along with LTM candidate configurations. At least one of a fallback LTM configuration or a fallback Conditional Handover (CHO) configuration 338 is prepared 332 for at least one target cell selected from the one or more LTM candidate cells 314, 318. The preparing 332 the fallback CHO configuration for the at least one target cell is able to include obtaining the fallback CHO configuration from a target Distributed Unit (DU) 314. The fallback CHO configuration includes a delta and/or a rule for converting the LTM target cell configuration to the fallback CHO configuration or receiving the full fallback CHO configuration from the target DU 314. The at least one fallback LTM configuration for the at least one target cell is also able to include the at least one fallback LTM configuration with full resource reservation, wherein the fallback CHO configuration includes at least a fallback CHO criteria being added to an LTM configuration. The preparing 332 the at least one of the fallback LTM configuration or the fallback CHO configuration for the at least one target cell is able to further include determining whether handover to the at least one target cell is susceptible to HO failure based on the HO failure data 323. In response to the at least one target cell, e.g. DU2 314, being susceptible to HO failure, neighbor candidate cells, e.g., candidate cell 318, of the at least one target cell 314 are determined, and the at least one fallback LTM configuration or the fallback CHO configuration for the neighbor candidate cells 318 are prepared 332.

A Downlink (DL) RRC Message Transfer message 340 is sent by the CU 316 to the Serving DU, e.g., DU1 312, which includes RRC Re-Configuration with prepared LTM Target Cell Configurations, and/or Fallback CHO Configurations. The RRC Message 340 is a container inside an F1 message.

The Serving DU, DU1 312, sends the UE 310 an RRC Re-Configuration message 342 including LTM Target Cell Configurations, and Fallback CHO Configurations. Thus, the UE 310 is able to be provided with the prepared fallback LTM configuration 342.

The UE 310 stores the LTM target cell configuration and the fallback CHO configuration 344. The Serving DU, DU1 312, sends the UE 310 a PDCCH Order message 350 that includes at least the Target Cell PCI.

The PDCCH Order message 350 orders the UE 310 to perform UL Sync using a Random Access Message 352 to acquire the timing advance of one or more candidate cells. The UE 310 sends the Candidate DU, DU2 314, an Random Access Request message 352 that includes RACH preamble.

The Candidate DU, DU2 314, responds with a Random Access Response (RAR) message 354 that includes a Timing Advance (TA) for the Candidate DU, DU2 314. The Random Access Response (RAR) message 354 carrying the TA of the Candidate cell, DU2 314, can be sent directly from the candidate DU to the UE, as an alternative 360, is also able to be sent 362 from the Candidate DU, DU2 314, to the CU 316, and then sent 364 from the CU 316 to the serving DU, DU1 312, for subsequent transmission 366 to the UE 310.

The UE 310 acquires the Target Cell TA to be able to perform a RACH-Less HO 370 whenever a LTM cell switch command is issued by the gNB-DU.

Intra-Frequency L1 Measurement Report 372 is sent from the UE 310 to the Serving DU, DU1 312. The Serving DU, DU 1 312, determines 374 the best target cell for the UE 310, e.g., to perform an LTM HO to a cell of DU2 314.

A DL MAC CE 376 is sent from the Serving DU, DU1 312, to the UE 310. The MAC CE 376 carries the LTM cell switch command, including at least the Target Cell PCI and beam identifier of the target cell.

UE 310 performs RACH-Less handover 378 to the Target Cell, DU2 314, and this is assumed here to fail.

The UE 310 detects RLF or LTM HO failure 380. The UE 310 activates a Fallback CHO Configuration 382 and performs fallback CHO to the selected fallback candidate cell 314 in response to the CHO criteria being satisfied.

In response to the CHO Criteria being satisfied, the UE 310 performs CHO to cell 314 by performing RACH 384 based on how the network has configured the UE 310. Thus, the UE 310 is able to autonomously execute the cell switch 382 in the event of detecting a handover failure 380 without sending any additional signaling.

As described herein, the fallback handover configuration is an LTM handover configuration or a Conditional Handover (CHO) configuration 344. An LTM candidate cell configuration is able to be converted into a CHO autonomous configuration or target cell configuration where the UE 310 executes target cell configuration without any further signaling assistance from the network.

The CU 316 prepares a fallback CHO Configuration using an LTM Candidate cell configuration by adding at least a CHO criteria and other required elements. The CU 316 converts an LTM candidate cell configuration in response to there being a RLF or a LTM HO failure detected 380 and the UE 310 is configured with the LTM candidate cell configuration or the CHO configuration. For example, a CHO criteria is a condition that is to be met before performing the handover. In response to the condition not being met, the UE 310 cannot execute the CHO handover. The CHO criteria is provided along with the configuration. Thus, the fallback configuration 344 is able to be a prepared LTM handover configuration, a prepared CHO configuration, or both, which are provided to the UE 310.

As mentioned earlier, the UE 310 is able to be configured with multiple LTM candidate cells. In such a scenario, the CU 316 is equipped to select the target cells 314, 318 that the fallback configuration is to be applied, i.e., in response to the resources being reserved and a fallback configuration is prepared or requested from the target DU 314, 318. In response to selecting a cell out of the LTM candidate cells 314, 318 for a CHO fallback configuration, full resource reservation is to be performed for a cell at the target gNB-DU. To help or assist identification of such a cell, AI-ML aided cell identification is used by the CU 316 to identify a cell and to determine full whether full resource reservation is to be applied as opposed to partial resource reservation or delayed resource reservation.

The Serving DU 312 and or CU 316 are able to perform RLF and HO handover failure data collection to identify the given LTM target cell experiencing RLF failure or HO failure over a period of time. The RLF and LTM HO failure data collection is accumulated for different Dus 312, 314, 318. For example, in response to a handover from A to B, where A is the LTM serving cell and B is the LTM target cell, the DU 312 and CU 316 prepare a list of the serving cell 312 and the target cells 314, 318 that undergo RLF or LTM handover failure.

In response to gNB-CU 316 performing inter gNB-DU LTM candidate cell preparation for a UE 310 and finds that a UE 310 has current serving cell A 312 and candidate cell B 314 has to be prepared as an LTM target cell, the CU 316 checks for RLF and LTM HO failure data collected for HOs from cell A 312 to cell B 314, i.e., UEs 310 undergoing RLF or unsuccessful LTM HO from cell A 312 to cell B 314.

In response to RLF or unsuccessful LTM HO from cell A 312 to cell B 314, the CU 316 ensures that in response to cell B 314 being prepared or selected for LTM HO, the neighboring cells, e.g., candidate cell 318, of candidate cell B 314 are adequately prepared for fallback configuration. For example, in response to Cell C and Cell D, e.g., candidate cell 318, being neighboring cells of candidate cell B 314, and cell C and cell D, e.g., candidate cell 318, are also going to be prepared as LTM candidate cells for the same UE 310, the CU 316 requests an LTM target cell configuration with full resource reservation and also prepares an LTM and/or a CHO fallback configuration for cells C and D, e.g., candidate cell 318.

In case of inter-DU, the serving DU 312 does not know whether RLF or unsuccessful LTM HO occurred, the CU 316 performs the RLF and LTM HO failure data collection, e.g., the UE 310 undergoes RLF while going from serving cell A 312 to a cell belonging to a different DU, e.g., DU2 314, the CU 316 performs the RLF and LTM HO failure data collection. In case of intra-DU, the DU is aware of both the source and target cells. Hence the DU is able to detect HO failure. This data is reported periodically to the CU 316 by the UE 310 and accumulated for different DUs 312, 314, 318. This provides an indication of which cells are susceptible to RLF or LTM HO failure, and which cells are potentially viable for handover failures or RLF.

Thus, in response to the CU 316 performing an inter-DU LTM candidate cell preparation for a UE 310 and determines that a UE 310 has current serving cell A 312 and candidate cell B 314 is to be prepared as an LTM target cell, the CU 316 checks whether RLF and LTM HO failure from cell A 312 to cell B 314 has previously occurred. In response to determining that RLF and LTM HO failure from cell A 312 to cell B 314 has previously occurred, the CU 316 ensures that in response to cell B 314 being prepared or selected for LTM Handover, the neighboring cells of cell B, e.g., candidate DU 3 318, are adequately prepared for fallback.

The CU 316 requests an LTM target cell configuration with full resource reservation, and also prepares an LTM and/or CHO fallback configuration for cell C and cell D, e.g., candidate DU 3 318. Accordingly, full resources are reserved for cell C and cell D. e.g., candidate DU 3 318, and LTM or CHO fallback configurations are prepared for cell C and cell D, e.g., candidate DU 3 318, so that in response to the UE 310 undergoing cell switch failure while moving to cell B 314, the UE 310 has cell C and cell D, e.g., candidate DU 3 318, as a fallback. Cell C and Cell D are used here as examples. Those skilled in the art understand that the cells are able to be any other cell including a former serving cell.

Thus, according to at least one embodiment, a fallback configuration is prepared for one of a Radio Link Failure (RLF) or a handover (HO) failure of a User Equipment (UE). One or more Layer 1 (L1)/Layer 2 (L2) Triggered Mobility (LTM) candidate cells are identified for fallback. At least one of a handover (HO) failure or a Radio Link Failure (RLF) is predicted for one or more LTM target cells. In response to predicting at least one of the RLF or HO failure for the one or more LTM target cells, at least one of a fallback LTM configuration or a fallback Conditional Handover (CHO) configuration is prepared for at least one target cell selected from the one or more LTM candidate cells. The UE is provide with the at least one of the prepared fallback LTM configuration or the fallback CHO configuration for the at least one target cell. Control information is sent to the UE to initiate a cell switch by the UE from a serving cell to the at least one target cell based on the at least one of the fallback LTM configuration or the fallback CHO configuration for the at least one target cell.

Figure 4:
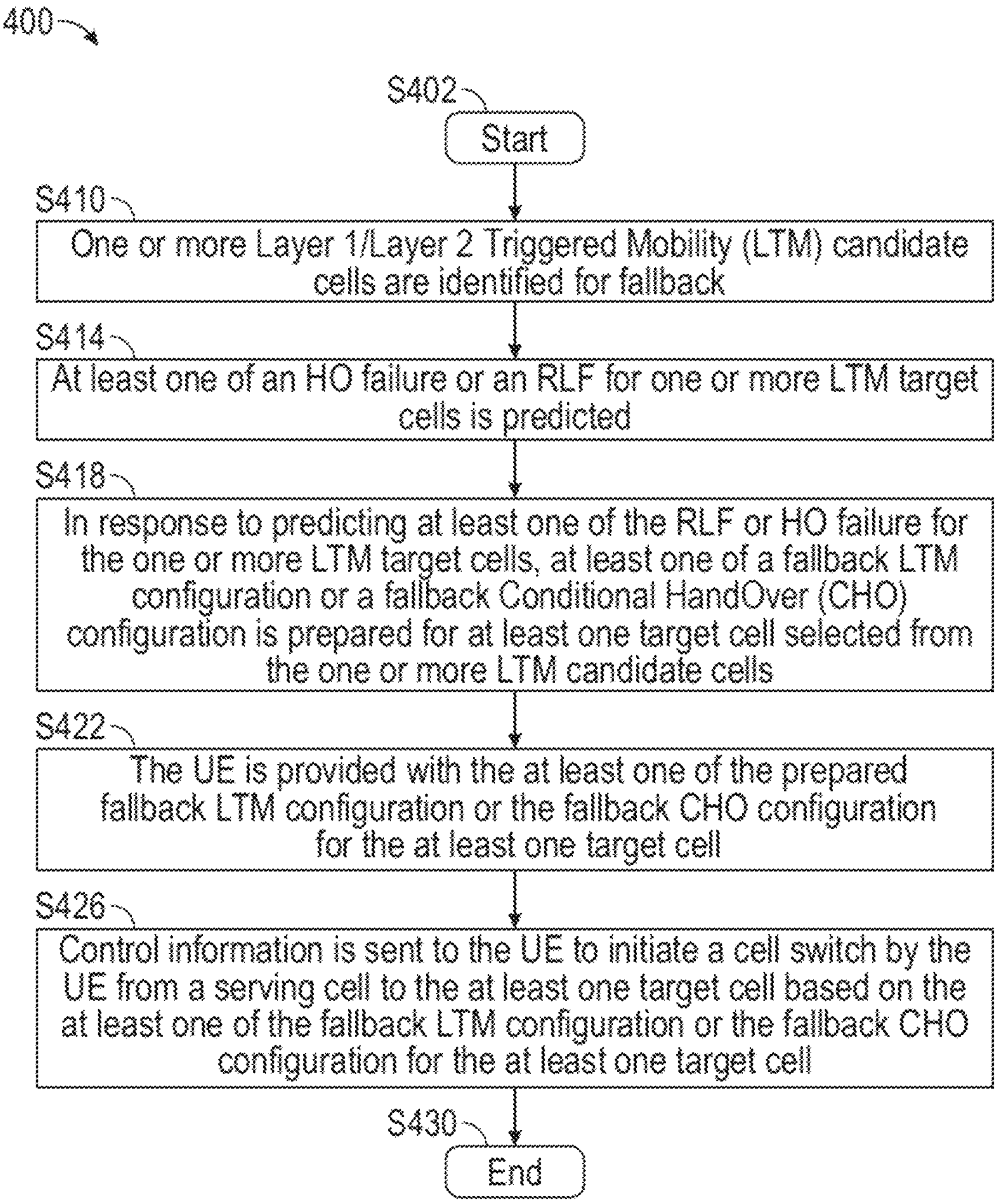
FIG. 4 is a flowchart of a method for handling LTM handover failure or radio link failure according to at least one embodiment.

FIG. 4 is a flowchart 400 of a method for handling LTM handover failure or radio link failure according to at least one embodiment.

In FIG. 4, the method starts S402 and one or more L1 /L2 Triggered Mobility (LTM) candidate cells are identified for fallback S410. Referring to FIG. 3A, identifying the one or more LTM candidate cells for fallback includes identifying which of configured LTM candidate cells of the UE are eligible to be configured for fallback. The one or more LTM candidate cells is able to be identified by receiving a periodic Resource Status Update 322, 323, 326 from one or more gNB-Distributed Units (DUs) 312, 314, 318, wherein the periodic Resource Status Update 322 includes HO failure data 323 for the one or more LTM candidate cells. The HO failure data 323 for the one or more LTM candidate cells includes data indicating RLF or LTM HO failure associated with the one or more LTM candidate cells. The HO failure data 323 for the one or more LTM candidate cells of the one or more gNB-DUs is accumulated over a period of time 328.

At least one of an HO failure or an RLF for one or more LTM target cells is predicted S414. The HO failure or the RLF for one or more LTM target cells is predicted based on the accumulating of the HO failure data 328 and RRC Measurements (L3) 330.

In response to predicting at least one of the RLF or HO failure for the one or more LTM target cells, at least one of a fallback LTM configuration or a fallback Conditional Handover (CHO) configuration is prepared for at least one target cell selected from the one or more LTM candidate cells S418. Referring to FIG. 3A, at least one of a fallback LTM configuration or a fallback Conditional Handover (CHO) configuration 338 is prepared 332 for at least one target cell selected from the one or more LTM candidate cells. The preparing 332 the fallback CHO configuration for the at least one target cell is able to include obtaining the fallback CHO configuration from a target Distributed Unit (DU) 314. The fallback CHO configuration includes a delta for converting the LTM target cell configuration to the fallback CHO configuration or receiving the fallback CHO configuration from the target DU 314. The at least one fallback LTM configuration for the at least one target cell is also able to include the at least one fallback LTM configuration with full resource reservation, wherein the fallback CHO configuration includes at least a fallback CHO criteria being added to an LTM configuration. The preparing 332 the at least one of the fallback LTM configuration or the fallback CHO configuration for the at least one target cell is able to further include determining whether handover to the at least one target cell is susceptible to HO failure based on the HO failure data 323. In response to the at least one target cell being susceptible to LTM cell switch HO failure, neighbor candidate cells of the at least one target cell 314 are determined, and the at least one fallback LTM configuration or the fallback CHO configuration for the neighbor candidate cells are prepared 332.

The UE is provided with the at least one of the prepared fallback LTM configuration or the fallback CHO configuration for the at least one target cell S422. Referring to FIG. 3A, the UE 310 is able to be provided with the prepared fallback LTM configuration 342. Referring to FIG. 3B, the UE 310 is able to autonomously execute the cell switch 382 in the event of detecting a handover failure or radio link failure (RLF) 380 without sending any additional signaling.

Control information is sent to the UE to initiate a cell switch by the UE from a serving cell to the at least one target cell based on the at least one of the fallback LTM configuration or the fallback CHO configuration for the at least one target cell S426. Referring to FIG. 3A, a DL MAC CE 376 is sent from the Serving DU, DU1 312, to the UE 310. The MAC CE 376 carries the LTM cell switch command, including the Target Cell PCI and beam identifier. Referring to FIG. 3B, the UE 310 is able to autonomously execute the cell switch 382 in the event of detecting a handover failure or RLF 380 without sending any additional signaling.

The process then terminates S430.

According to at least one embodiment, a method for preparing a fallback configuration for one of a Radio Link Failure (RLF) or a handover (HO) failure of a User Equipment (UE) includes identifying one or more L1 /L2 Triggered Mobility (LTM) candidate cells for fallback, predicting at least one of an HO failure or an RLF for one or more LTM target cells, in response to predicting the at least one of the RLF or HO failure for the one or more LTM target cells, preparing at least one of a fallback LTM configuration or a fallback Conditional Handover (CHO) configuration for at least one of the one or more LTM target cells selected from one or more LTM candidate cells, providing the UE with the at least one of the prepared fallback LTM configuration or the fallback CHO configuration for the at least one of the one or more target cells, and sending control information to the UE to initiate a cell switch by the UE from a serving cell to the at least one of the one or more LTM target cells based on the at least one of the prepared fallback LTM configuration or the fallback CHO configuration for the at least one of the one or more LTM target cells.

Figure 5:
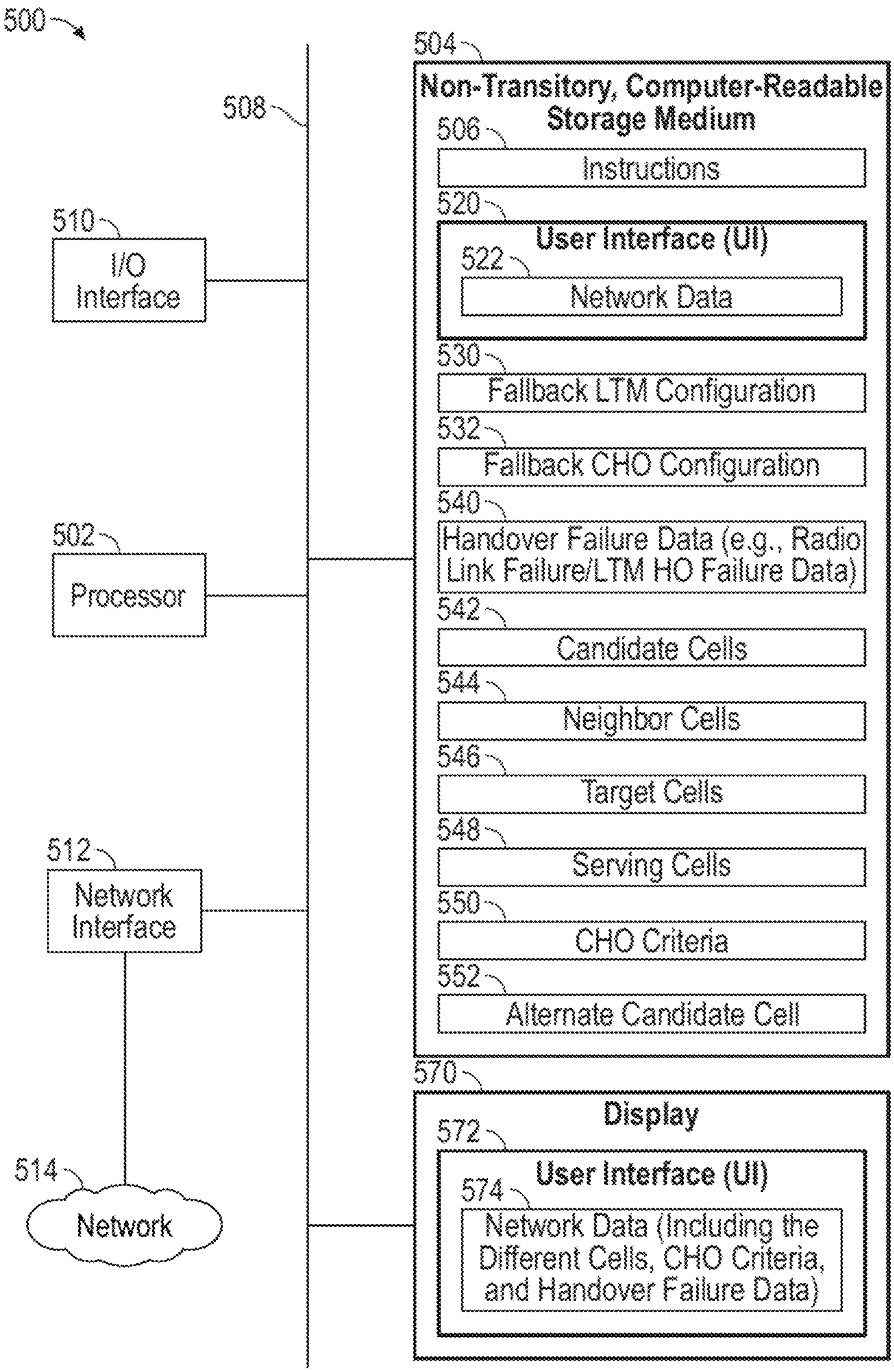
FIG. 5 is a high-level functional block diagram of a processor-based system according to at least one embodiment.

FIG. 5 is a high-level functional block diagram of a processor-based system 500 according to at least one embodiment.

In at least one embodiment, processing circuitry 500 provides radio link failure (RLF) or LTM handover failure handling. Processing circuitry 500 implements RLF or LTM handover failure handling using Processor 502. Processing circuitry 500 also includes a Non-Transitory, Computer-Readable Storage Medium 504 that is used to implement RLF or LTM handover failure handling. Non-Transitory, Computer-Readable Storage Medium 504, amongst other things, is encoded with, i.e., stores, Instructions 506, i.e., computer program code, that are executed by Processor 502 causes Processor 502 to perform operations for RLF or LTM handover failure handling. Execution of Instructions 506 by Processor 502 represents (at least in part) an application which implements at least a portion of the methods described herein in accordance with one or more embodiments (hereinafter, the noted processes and/or methods).

Processor 502 is electrically coupled to Non-Transitory, Computer-Readable Storage Medium 504 via a Bus 508. Processor 502 is electrically coupled to an Input/Output (I/O) Interface 510 by Bus 508. A Network Interface 512 is also electrically connected to Processor 502 via Bus 508. Network Interface 512 is connected to a Network 514, so that Processor 502 and Non-Transitory, Computer-Readable Storage Medium 504 connect to external elements via Network 514. Processor 502 is configured to execute Instructions 506 encoded in Non-Transitory, Computer-Readable Storage Medium 504 to cause processing circuitry 500 to be usable for performing at least a portion of the processes and/or methods. In one or more embodiments, Processor 502 is a Central Processing Unit (CPU), a multiprocessor, a distributed processing system, an Application Specific Integrated Circuit (ASIC), and/or a suitable processing unit.

Processing circuitry 500 includes I/O Interface 510. I/O interface 510 is coupled to external circuitry. In one or more embodiments, I/O Interface 510 includes a keyboard, keypad, mouse, trackball, trackpad, touchscreen, and/or cursor direction keys for communicating information and commands to Processor 502.

Processing circuitry 500 also includes Network Interface 512 coupled to Processor 502. Network Interface 512 allows processing circuitry 500 to communicate with Network 514, to which one or more other computer systems are connected. Network Interface 512 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 500 is configured to receive information through I/O Interface 510. The information received through I/O Interface 510 includes one or more of instructions, data, design rules, libraries of cells, and/or other parameters for processing by Processor 502. The information is transferred to Processor 502 via Bus 508. Processing circuitry 500 is configured to receive information related to a User Interface (UI) through I/O Interface 510. The information is stored in Non-Transitory, Computer-Readable Storage Medium 504 as UI 520. User Interface 520 is used to process Network Data 522 for handling RLF or LTM handover failure, such as L1/L2/L3 RRC measurements.

In one or more embodiments, one or more Non-Transitory, Computer-Readable Storage Medium 504 having stored thereon Instructions 506 (in compressed or uncompressed form) that may be used to program a computer, processor, or other electronic device) to perform processes or methods described herein. The one or more Non-Transitory, Computer-Readable Storage Medium 504 include one or more of an electronic storage medium, a magnetic storage medium, an optical storage medium, a quantum storage medium, or the like.

For example, the Non-Transitory, Computer-Readable Storage Medium 504 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 504 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 504 stores Instructions 506 configured to cause Processor 502 to perform at least a portion of the processes and/or methods for handling RLF or LTM handover failure. In one or more embodiments, Non-Transitory, Computer-Readable Storage Medium 504 also stores information, such as algorithm which facilitates performing at least a portion of the processes and/or methods for handling RLF or LTM handover failure.

Accordingly, in at least one embodiment, Processor 502 executes Instructions 506 stored on the one or more Non-Transitory, Computer-Readable Storage Medium 504 to implement RLF or LTM handover failure handling. Handover Failure Data, such as Radio Link Failure (RLF) or LTM HO failure data 540 is received by a gNB via a resource status update. The Handover Failure Data 540 is received from one or more Candidate Cells 542, Neighbor Cells 544, or Target Cells 546, wherein the handover failure data from the one or more Candidate Cells 542, Neighbor Cells 544, or Target Cells 546 is accumulated over a predetermined period of time. Based on the handover failure data, a list of cells that undergo failure, including a Serving Cell 548 and Target Cells 546 is prepared. Fallback LTM Configurations 530, such LTM candidate Cell Configuration, is prepared for the LTM Target Cell 546 and a Fallback CHO Configuration 532 is prepared for at least one alternate Candidate Cell 552 based on the Handover Failure Data 540. Prepared fallback LTM Configurations 530 is able to include full resource reservation. The Fallback CHO Configuration 532 is able to be generated by converting a Fallback LTM Configurations 530 into a Fallback CHO Configuration 532 by adding CHO Criteria 550. Fallback CHO Configuration 532 is initiated by performing autonomous CHO with at least one Alternate Candidate Cell 552 of the Target Cell 546. Processor 502 is able to identify one or more Lower-Level Triggered Mobility (LTM) candidate cells 542, 552 for fallback, predict at least one of an HO failure or an RLF for one or more LTM target cells based on accumulated Handover Failure Data 540, in response to predicting at least one of the RLF or HO failure for the one or more LTM target cells, prepare at least one of a Fallback LTM Configurations 530 or a Fallback CHO Configuration 532 for at least one Target Cell 546 selected from the one or more LTM Candidate Cells 542, 552, provide the UE with the at least one of the prepared Fallback LTM Configuration 530 or the Fallback CHO Configuration 532 for the at least one Target Cell 546, and send control information to the UE to initiate a cell switch by the UE from a Serving Cell 548 to the at least one Target Cell 546 based on the at least one of the prepared Fallback LTM Configuration 530 or the Fallback CHO Configuration 532 for the at least one Target Cell 546. A Display 570 includes a User Interface (UI) 572 for displaying Network Data 574, including identification of the different Cells, CHO Criteria, and Handover Failure Data.

Embodiments described herein provide a method that provides one or more advantages. For example, RRC re-establishment can be avoided during Radio Link Failure (RLF) or LTM Handover (HO) failure.

An aspect of this description is directed to a method [1] for preparing a fallback configuration for one of a Radio Link Failure (RLF) or a handover (HO) failure of a User Equipment (UE) includes identifying one or more Layer 1 (L1)/Layer 2 (L2) Triggered Mobility (LTM) candidate cells for fallback, predicting at least one of an HO failure or an RLF for one or more LTM target cells, in response to predicting the at least one of the RLF or HO failure for the one or more LTM target cells, preparing at least one of a fallback LTM configuration or a fallback Conditional Handover (CHO) configuration for at least one of the one or more target cells selected from one or more LTM candidate cells, providing the UE with the at least one of the prepared fallback LTM configuration or the fallback CHO configuration for the at least one of the one or more target cells, and sending control information to the UE to initiate a cell switch by the UE from a serving cell to the at least one of the one or more target cells based on the at least one of the prepared fallback LTM configuration or the fallback CHO configuration for the at least one of the one or more target cells.

The method described in [1], wherein the providing the UE with the prepared fallback LTM configuration includes providing the UE with the prepared fallback LTM configuration for autonomous execution of the cell switch by the UE in the event of the at least one of the HO failure or the RLF without sending any additional signaling.

The method described in [1] to [2], wherein the preparing the fallback CHO configuration for the at least one of the one or more target cells includes obtaining the fallback CHO configuration from a target Distributed Unit (DU), wherein the obtaining the fallback CHO configuration includes receiving from the target DU a delta for converting the LTM target cell configuration to the fallback CHO configuration or receiving the fallback CHO configuration from the target DU.

The method described in [1] to [3], wherein the identifying the one or more LTM candidate cells for fallback includes identifying which of configured LTM candidate cells of the UE are eligible to be configured for fallback.

The method described in [1] to [4], wherein the preparing the at least one fallback LTM configuration for the at least one of the one or more LTM target cells includes preparing the at least one fallback LTM configuration with full resource reservation at the at least one of the one or more LTM target cells, and wherein the preparing the fallback CHO configuration includes adding at least a fallback CHO criteria to an LTM configuration.

The method described in [1] to [5], wherein the identifying the one or more LTM candidate cells includes receiving a periodic resource status update from one or more gNB-Distributed Units (DUs), that includes HO failure data for the one or more LTM candidate cells, and accumulating the HO failure data for the one or more LTM candidate cells of the one or more gNB-DUs over a period of time; and wherein the preparing the at least one of the fallback LTM configuration or the fallback CHO configuration for the at least one of the one or more LTM target cells includes determining whether handover to the at least one of the one or more LTM target cells is susceptible to HO failure based on the HO failure data, in response to the at least one of the one or more LTM target cells being susceptible to LTM cell switch HO failure, determining neighbor candidate cells of the at least one of the one or more LTM target cells, and preparing the at least one fallback LTM configuration or the fallback CHO configuration for the neighbor candidate cells.

The method described in [1] to [6], wherein the receiving the periodic resource status update that includes the HO failure data for the one or more LTM candidate cells includes receiving data indicating RLF or LTM HO failure associated with the one or more LTM candidate cells and accumulating the data indicating the RLF or LTM HO failure associated with the one or more LTM candidate cells belonging to the one or more gNB-DUs over a predetermined period of time.

An aspect of this description is directed to a Radio Access Network (RAN) Node [8], including a memory storing computer-readable instructions, and a processor connected to the memory, wherein the processor is configured to execute the computer-readable instructions to perform operations to identify one or more Layer 1 (L1)/Layer 2 (L2) Triggered Mobility (LTM) candidate cells for fallback, predict at least one of an HO failure or a Radio Link Failure (RLF) for one or more LTM target cells, in response predicting the at least one of the HO failure or the RLF for the one or more LTM target cells, prepare at least one of a fallback LTM configuration or a fallback Conditional Handover (CHO) configuration for at least one of the one or more target cell selected from the one or more LTM candidate cells, provide the UE the at least one of the prepared fallback LTM configuration or the fallback CHO configuration for the at least one of the one or more LTM target cells, and send control information to the UE to initiate a switch by the UE from a serving cell to the at least one of the at least one of the one or more LTM target cells based on the at least one of the prepared fallback LTM configuration or the fallback CHO configuration for the at least one of the one or more LTM target cells.

The RAN Node described in [8], wherein the processor is configured to provide the UE the at least one of the prepared fallback LTM configuration and or the fallback CHO configuration for the at least one of the one or more LTM target cells by providing the UE with the prepared fallback LTM configuration for autonomous execution of the cell switch by the UE in the event of the at least one of the HO failure or the RLF without sending any additional signaling.

The RAN Node described in [8] to [9], wherein the processor is further configured to prepare the fallback CHO configuration for the at least one of the one or more LTM target cells by receiving from a target Distributed Unit (DU) a delta for converting the LTM target cell configuration to the fallback CHO configuration or by receiving fallback CHO configuration from the target DU.

The RAN Node described in [8] to [10], wherein the processor is configured to identify the one or more LTM candidate cells for fallback by identifying which of configured LTM candidate cells of the UE are eligible to be configured for fallback.

The RAN Node described in [8] to [11], wherein the processor is configured to prepare the at least one fallback LTM configuration for the at least one of the one or more LTM target cells by preparing the at least one fallback LTM configuration with full resource reservation at the at least one of the one or more LTM target cells, and to prepare the fallback CHO configuration by adding at least a fallback CHO criteria to an LTM configuration.

The RAN Node described in [8] to [12], wherein the processor is configured to receive a periodic resource status update from one or more gNB-Distributed Units (DUs) that includes HO failure data for the one or more LTM candidate cells, and accumulate the HO failure data for the one or more LTM candidate cells of the one or more gNB-Dus over a period of time; and prepare the at least one of the fallback LTM configuration or the fallback CHO configuration for the at least one of the one or more LTM target cells by determining whether handover to the at least one of the one or more LTM target cells is susceptible to HO failure based on the HO failure data, in response to the at least one of the one or more LTM target cells being susceptible to LTM cell switch HO failure, determining neighbor candidate cells of the at least one of the one or more LTM target cells, and preparing the at least one fallback LTM configuration or the fallback CHO configuration for the neighbor candidate cells.

The RAN Node described in [8] to [13], wherein the processor is configured to receive the periodic resource status update that includes the HO failure data for the one or more LTM candidate cells by receiving data indicating RLF or LTM HO failure associated with the one or more LTM candidate cells and accumulating the data indicating RLF or LTM HO failure associated with the one or more LTM candidate cells belonging to the one or more gNB-Dus over a predetermined period of time.

An aspect of this description is directed to a non-transitory computer-readable media having computer-readable instructions stored thereon [15], which in response to being executed by a processor causes the processor to perform operations including identifying one or more Layer 1 (L1)/Layer 2 (L2) Triggered Mobility (LTM) candidate cells for a fallback for User Equipment (UE), predicting at least one of a handover (HO) failure or a Radio Link Failure (RLF) for one or more LTM target cells, in response to predicting the at least one of the RLF or HO failure for the UE, preparing at least one of a fallback LTM configuration or a fallback Conditional Handover (CHO) configuration for at least one of the one or more LTM target cells selected from one or more LTM candidate cells, providing the UE with the at least one of the prepared fallback LTM configuration or the fallback CHO configuration for the at least one of the one or more LTM target cells, and sending control information to the UE to initiate a switch by the UE from a serving cell to the at least one of the one or more LTM target cells based on the at least one prepared fallback LTM configuration or the fallback CHO configuration for the at least one of the one or more LTM target cells.

The non-transitory computer-readable media described in [15], wherein the providing the UE with the prepared fallback LTM configuration includes providing the UE with the prepared fallback LTM configuration for autonomous execution of the cell switch by the UE in the event of the at least one of the HO failure or the RLF without sending any additional signaling.

The non-transitory computer-readable media described in [15] to [16], wherein the preparing the fallback CHO configuration for the at least one of the one or more LTM target cells includes obtaining the fallback CHO configuration from a target Distributed Unit (DU), wherein the obtaining the fallback CHO configuration includes receiving from the target DU a delta for converting the LTM target cell configuration to the fallback CHO configuration or receiving the fallback CHO configuration from the target DU.

The non-transitory computer-readable media described in [15] to [17], wherein the preparing the at least one fallback LTM configuration for the at least one of the one or more LTM target cells includes preparing the at least one fallback LTM configuration with full resource reservation at the at least one of the one or more LTM target cells, and wherein the preparing the fallback CHO configuration includes adding at least a fallback CHO criteria to an LTM configuration.

The non-transitory computer-readable media described in [15] to [18], wherein the identifying the one or more LTM candidate cells includes receiving a periodic resource status update from one or more gNB-Distributed Units (DUs) that includes HO failure data for the one or more LTM candidate cells, and accumulating the HO failure data for the one or more LTM candidate cells of the one or more gNB-DUs over a period of time; and wherein the preparing the at least one of the fallback LTM configuration or the fallback CHO configuration for the at least one of the one or more LTM target cells includes determining whether handover to the at least one of the one or more LTM target cells is susceptible to HO failure based on the HO failure data, in response to the at least one of the one or more LTM target cells being susceptible to LTM cell switch HO failure, determining neighbor candidate cells of the at least one of the one or more LTM target cells, and preparing the at least one fallback LTM configuration or the fallback CHO configuration for the neighbor candidate cells.

The non-transitory computer-readable media described in [15] to [19], wherein the receiving the periodic resource status update that includes the HO failure data for the one or more LTM candidate cells includes receiving data indicating RLF or LTM HO failure associated with the one or more LTM candidate cells and accumulating the data indicating the RLF or LTM HO failure associated with the one or more LTM candidate cells belonging to the one or more gNB-DUs over a predetermined period of time. Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for preparing a fallback configuration for one of a Radio Link Failure (RLF) or a handover (HO) failure of a User Equipment (UE), comprising:

identifying one or more Layer 1 (L1)/Layer 2 (L2) Triggered Mobility (LTM) candidate cells for fallback;

accumulating HO failure data for the one more LTM candidate cells, wherein the HO failure data for the one or more LTM candidate cells includes data indicating RLF or HO failure associated with the one or more LTM candidate cells;

predicting at least one of an HO failure or an RLF for one or more LTM target cells based on the accumulated HO failure data;

in response to the predicting the at least one of the RLF or HO failure for the one or more LTM target cells, preparing at least one of a fallback LTM configuration or a fallback Conditional Handover (CHO) configuration for at least one of the one or more LTM target cells selected from the one or more LTM candidate cells;

providing the UE with the at least one of the prepared fallback LTM configuration or the fallback CHO configuration for the at least one of the one or more LTM target cells; and sending control information to the UE to initiate a cell switch by the UE from a serving cell to the at least one of the one or more LTM target cells based on the at least one of the prepared fallback LTM configuration or the fallback CHO configuration for the at least one of the one or more LTM target cells.

2. The method of claim 1, wherein the providing the UE with the prepared fallback LTM configuration includes providing the UE with the prepared fallback LTM configuration for autonomous execution of the cell switch by the UE in event of the at least one of the HO failure or the RLF, without sending any additional signaling.

3. The method of claim 1, wherein the preparing the fallback CHO configuration for the at least one of the one or more LTM target cells includes obtaining the fallback CHO configuration from a target Distributed Unit (DU), wherein the obtaining the fallback CHO configuration includes receiving from the target DU a delta for converting the fallback LTM configuration to the fallback CHO configuration or receiving the fallback CHO configuration from the target DU.

4. The method of claim 1, wherein the identifying the one or more LTM candidate cells for fallback includes identifying which of configured LTM candidate cells of the UE are eligible to be configured for fallback.

5. The method of claim 1, wherein the preparing the at least one fallback LTM configuration for the at least one of the one or more target cells includes preparing the at least one fallback LTM configuration with full resource reservation at the at least one of the one or more LTM target cells, and wherein the preparing the fallback CHO configuration includes adding at least a fallback CHO criteria to an LTM configuration.

6. The method of claim 1, wherein the identifying the one or more LTM candidate cells includes receiving a periodic resource status update from one or more gNB-Distributed Units (DUs), that includes the HO failure data for the one or more LTM candidate cells, and accumulating the HO failure data for the one or more LTM candidate cells of the one or more gNB-DUs over a period of time; and wherein the preparing the at least one of the fallback LTM configuration or the fallback CHO configuration for the at least one of the one or more LTM target cells includes determining whether handover to the at least one of the one or more LTM target cells is susceptible to the HO failure based on the HO failure data, in response to the at least one of the one or more LTM target cells being susceptible to LTM cell switch HO failure, determining neighbor candidate cells of at least one of the one or more LTM target cells, and preparing the at least one fallback LTM configuration or the fallback CHO configuration for the neighbor candidate cells.

7. The method of claim 6, wherein the receiving the periodic resource status update that includes the HO failure data for the one or more LTM candidate cells includes receiving data indicating the RLF or LTM HO failure associated with the one or more LTM candidate cells and accumulating the data indicating the RLF or LTM HO failure associated with the one or more LTM candidate cells belonging to the one or more gNB-DUs over a predetermined period of time.

8. A Radio Access Network (RAN) Node, configured to:

identify one or more Layer 1 (L1)/Layer 2 (L2) Triggered Mobility (LTM) candidate cells for fallback;

accumulate handover (HO) failure data for the one more LTM candidate cells, wherein the HO failure data for the one or more LTM candidate cells includes data indicating Radio Link Failure (RLF) or HO failure associated with the one or more LTM candidate cells;

predict at least one of HO failure or RLF for one or more LTM target cells based on the accumulated HO failure data;

in response to the predicting the at least one of the HO failure or the RLF for the one or more LTM target cells, prepare at least one of a fallback LTM configuration or a fallback Conditional Handover (CHO) configuration for at least one of the one or more LTM target cells selected from the one or more LTM candidate cells;

provide a User Equipment (UE) the at least one of the prepared fallback LTM configuration or the fallback CHO configuration for the at least one of the one or more LTM target cells; and send control information to the UE to initiate a cell switch by the UE from a serving cell to the at least one of the one or more LTM target cells based on the at least one of the prepared fallback LTM configuration or the fallback CHO configuration for the at least one of the one or more LTM target cells.

9. The RAN Node of claim 8, configured to provide the UE the at least one of the prepared fallback LTM configuration and or the fallback CHO configuration for the at least one of the one or more LTM target cells by providing the UE with the prepared fallback LTM configuration for autonomous execution of the cell switch by the UE in event of the at least one of the HO failure or the RLF without sending any additional signaling.

10. The RAN Node of claim 8, configured to prepare the fallback CHO configuration for the at least one of the one or more LTM target cells by receiving from a target Distributed Unit (DU) a delta for converting the fallback LTM configuration to the fallback CHO configuration or by receiving fallback CHO configuration from the target DU.

11. The RAN Node of claim 8, configured to identify the one or more LTM candidate cells for fallback by identifying which of configured LTM candidate cells of the UE are eligible to be configured for fallback.

12. The RAN Node of claim 8, configured to prepare the at least one fallback LTM configuration for the at least one of the one or more LTM target cells by preparing the at least one fallback LTM configuration with full resource reservation at the at least one of the one or more LTM target cells, and to prepare the fallback CHO configuration by adding at least a fallback CHO criteria to an LTM configuration.

13. The RAN Node of claim 8, configured to:

receive a periodic resource status update from one or more gNB-Distributed Units (DUs) that includes the HO failure data for the one or more LTM candidate cells, and accumulate the HO failure data for the one or more LTM candidate cells of the one or more gNB-DUs over a period of time; and prepare the at least one of the fallback LTM configuration or the fallback CHO configuration for the at least one of the one or more LTM target cells by determining whether handover to the at least one of the one or more LTM target cells is susceptible to the HO failure based on the HO failure data, in response to the at least one of the one or more LTM target cells being susceptible to LTM cell switch HO failure, determining neighbor candidate cells of the at least one of the one or more LTM target cells, and preparing the at least one fallback LTM configuration or the fallback CHO configuration for the neighbor candidate cells.

14. The RAN Node of claim 13, configured to receive the periodic resource status update that includes the HO failure data for the one or more LTM candidate cells by receiving data indicating the RLF or LTM HO failure associated with the one or more LTM candidate cells and accumulating the data indicating the RLF or LTM HO failure associated with the one or more LTM candidate cells belonging to the one or more gNB-DUs over a predetermined period of time.

15. A non-transitory computer-readable media having computer-readable instructions stored thereon, which when executed by a processor causes the processor to perform operations comprising:

identifying one or more Layer 1 (L1)/Layer 2 (L2) Triggered Mobility (LTM) candidate cells for a fallback for User Equipment (UE);

accumulating handover (HO) failure data for the one more LTM candidate cells, wherein the HO failure data for the one or more LTM candidate cells includes data indicating Radio Link Failure (RLF) or HO failure associated with the one or more LTM candidate cells;

predicting at least one of a HO failure or an RLF for one or more LTM target cells based on the accumulated HO failure data;

in response to the predicting the at least one of the RLF or the HO failure for the UE, preparing at least one of a fallback LTM configuration or a fallback Conditional Handover (CHO) configuration for at least one of the one or more LTM target cells selected from the one or more LTM candidate cells;

providing the UE with the at least one of the prepared fallback LTM configuration or the fallback CHO configuration for the at least one of the one or more LTM target cells; and sending control information to the UE to initiate a cell switch by the UE from a serving cell to the at least one of the one or more LTM target cells based on the at least one prepared fallback LTM configuration or the fallback CHO configuration for the at least one of the one or more LTM target cells.

16. The non-transitory computer-readable media of claim 15, wherein the providing the UE with the prepared fallback LTM configuration includes providing the UE with the prepared fallback LTM configuration for autonomous execution of the cell switch by the UE in event of the at least one of the HO failure or the RLF without sending any additional signaling.

17. The non-transitory computer-readable media of claim 15, wherein the preparing the fallback CHO configuration for the at least one of the one or more LTM target cells includes obtaining the fallback CHO configuration from a target Distributed Unit (DU), wherein the obtaining the fallback CHO configuration includes receiving from the target DU a delta for converting the fallback LTM configuration to the fallback CHO configuration or receiving the fallback CHO configuration from the target DU.

18. The non-transitory computer-readable media of claim 15, wherein the preparing the at least one fallback LTM configuration for the at least one of the one or more LTM target cells includes preparing the at least one fallback LTM configuration with full resource reservation at the at least one of the one or more LTM target cells, and wherein the preparing the fallback CHO configuration includes adding at least a fallback CHO criteria to an LTM configuration.

19. The non-transitory computer-readable media of claim 15, wherein the identifying the one or more LTM candidate cells includes receiving a periodic resource status update from one or more gNB-Distributed Units (DUs) that includes the HO failure data for the one or more LTM candidate cells, and accumulating the HO failure data for the one or more LTM candidate cells of the one or more gNB-DUs over a period of time; and wherein the preparing the at least one of the fallback LTM configuration or the fallback CHO configuration for the at least one of the one or more LTM target cells includes determining whether handover to the at least one of the one or more LTM target cells is susceptible to the HO failure based on the HO failure data, in response to the at least one of the one or more LTM target cells being susceptible to LTM cell switch HO failure, determining neighbor candidate cells of the at least one of the one or more LTM target cells, and preparing the at least one fallback LTM configuration or the fallback CHO configuration for the neighbor candidate cells.

20. The non-transitory computer-readable media of claim 19, wherein the receiving the periodic resource status update that includes the HO failure data for the one or more LTM candidate cells includes receiving data indicating the RLF or LTM HO failure associated with the one or more LTM candidate cells and accumulating the data indicating the RLF or LTM HO failure associated with the one or more LTM candidate cells belonging to the one or more gNB-DUs over a predetermined period of time.

* * * * *